United States Patent
Osenbach et al.

(10) Patent No.: US 7,693,059 B2
(45) Date of Patent: Apr. 6, 2010

(54) ADVANCED VPN ROUTING

(75) Inventors: Bryan D. Osenbach, Cary, NC (US); Michael L. Wiles, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 11/342,480

(22) Filed: Jan. 30, 2006

(65) Prior Publication Data

US 2007/0177575 A1    Aug. 2, 2007

(51) Int. Cl.
H04L 12/28 (2006.01)
H04L 12/56 (2006.01)
G06F 15/16 (2006.01)
G06F 15/173 (2006.01)

(52) U.S. Cl. .................... 370/231; 370/395.5; 370/409; 709/203; 709/238

(58) Field of Classification Search ................. 370/231, 370/395.5, 409; 709/203, 238
See application file for complete search history.

(56) References Cited

U.S. PATENT DOCUMENTS

| | | | | |
|---|---|---|---|---|
| 5,490,212 | A * | 2/1996 | Lautenschlager | 379/225 |
| 6,452,915 | B1 * | 9/2002 | Jorgensen | 370/338 |
| 6,694,437 | B1 * | 2/2004 | Pao et al. | 726/15 |
| 6,711,678 | B2 * | 3/2004 | Ferguson | 713/153 |
| 6,778,498 | B2 * | 8/2004 | McDysan | 370/231 |
| 6,810,417 | B2 * | 10/2004 | Lee | 709/220 |
| 6,980,556 | B2 * | 12/2005 | Vimpari | 370/395.52 |
| 7,324,447 | B1 * | 1/2008 | Morford | 370/231 |
| 7,447,151 | B2 * | 11/2008 | McDysan | 370/231 |
| 7,478,427 | B2 * | 1/2009 | Mukherjee et al. | 726/15 |
| 2003/0145227 | A1 | 7/2003 | Boden | |
| 2003/0149787 | A1 | 8/2003 | Mangan | |
| 2004/0120295 | A1 | 6/2004 | Liu et al. | |
| 2004/0174884 | A1 | 9/2004 | Wright | |

* cited by examiner

*Primary Examiner*—Alpus H Hsu

(57) ABSTRACT

Under the present invention, a method, system, and program product for providing advanced Virtual Private Network (VPN) routing that includes classifying a network transmission, between a user and a host, wherein the classification is based upon a destination port, protocol, and the like, for routing the communication either via the VPN or not via the VPN and selectively routing the network transmission based upon the classifying of the transmission.

11 Claims, 5 Drawing Sheets

ADVANCED VPN ROUTING

BACKGROUND OF THE INVENTION

1. Field of the Invention

The present invention relates generally to electronic communication and the routing of the various communications. More specifically, the present invention provides a method, system, and computer program product for advanced Virtual Private Network (VPN) routing.

2. Background Art

In the field of electronic communications users send and receive communications from various locations via various routes and over various mediums. One type of network communication scenario is via a VPN, wherein roaming capabilities are required. One such available embodiment of a VPN having roaming capabilities is called IBM WebSphere Everyplace Connection Manager ("WECM"), a product provided by the assignee of the present invention.

A typical scenario that employs a network that includes a VPN with roaming capabilities, such as WECM, is wherein various users (e.g., employees) are seeking to connect to one, or more, web-based applications provided by a source (e.g., client, employer, etc.). The user usually seeks seamless roaming capability across multiple types of wireless and wired networks. In this type of system, all the connections and communication between client/source and user/employee are VPN-based. That is the communication is through the VPN's concomitant parts (e.g., firewall(s), server(s), etc.), as well as the Internet.

In specific instances of the above mentioned scenario, performance degradation for both the users and the source and the various parts occurs. Thus, the current communication protocols in scenarios, such as WECM, create inefficiencies because all of the communications are forced to be VPN-based, regardless of the type or source of the communication.

In view of the foregoing, there exists a need for a method, system, and program product for providing advanced VPN routing whereby non-VPN traffic can hereby be routed directly to the destination.

SUMMARY OF THE INVENTION

In general, the present invention provides a method, system and program product for advanced Virtual Private Network (VPN) routing.

A first aspect of the present invention provides a method of advanced VPN routing, comprising the steps of: classifying a network transmission, between a user and a host, for a first route or a second route of communication, wherein the first route is via a VPN and the second route is not via the VPN, wherein the classifying is based upon at least one of a destination port and a protocol; and selectively routing the network transmission based upon the classifying.

A second aspect of the present invention provides a system for advanced VPN routing comprising: a system for classifying a network transmission, between a user and a host, for a first route or a second route of communication, wherein the first route is via a VPN and the second route is not via the VPN, wherein the classifying is based upon at least one of a destination port and a protocol; and a system for selectively routing the network transmission based upon the classifying.

A third aspect of the present invention provides program product stored on a recordable medium for providing advanced VPN routing, the computer readable medium comprising program code for performing the steps of: classifying a network transmission, between a user and a host, for a first route or a second route of communication, wherein the first route is via a VPN and the second route is not via the VPN, wherein the classifying is based upon at least one of a destination port and a protocol; and selectively routing the network transmission based upon the classifying.

A fourth aspect of the present invention provides deploying an application for advanced VPN routing, comprising: providing a computer infrastructure being operable to: classify a network transmission, between a user and a host, for a first route or a second route of communication, wherein the first route is via a VPN and the second route is not via the VPN, wherein the classifying is based upon at least one of a destination port and a protocol; and selectively route the network transmission based upon the classifying.

A fifth aspect of the present invention provides computer software for advanced VPN routing, the computer software comprising instructions to cause a computer system to perform the following functions: classifying a network transmission, between a user and a host, for a first route or a second route of communication, wherein the first route is via a VPN and the second route is not via the VPN, wherein the classifying is based upon at least one of a destination port and a protocol; and selectively routing the network transmission based upon the classifying.

Therefore, the present invention provides a method, system, and a computer program product for advanced VPN routing.

BRIEF DESCRIPTION OF THE DRAWINGS

These and other features of this invention will be more readily understood from the following detailed description of the various aspects of the invention taken in conjunction with the accompanying drawings in which.

Figure 1:
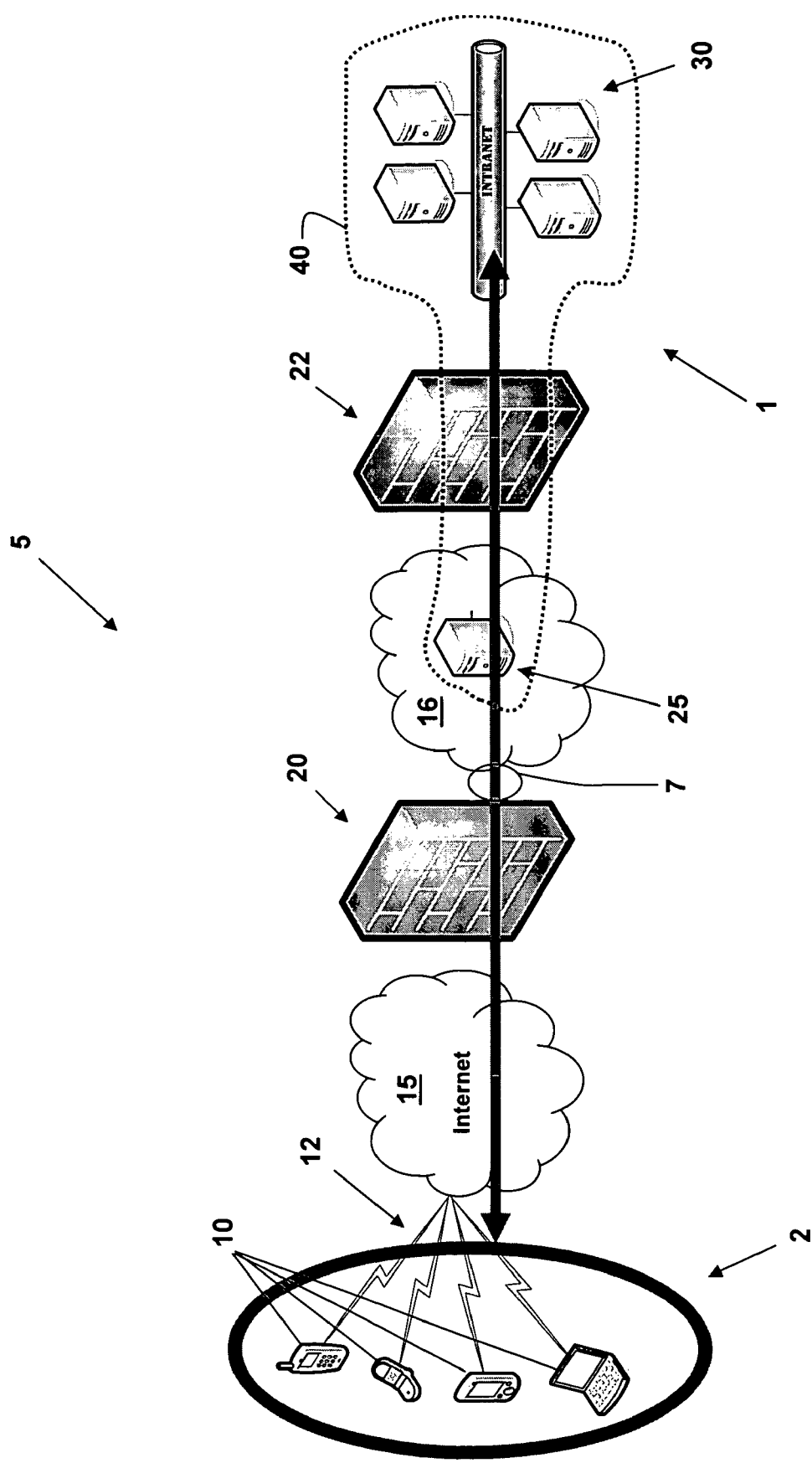
FIG. 1 depicts a first embodiment of a communication network in the related art.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for advanced Virtual Private Network (VPN) routing.

FIG. 1 shows a typical network, denoted by a 5, for communication, in a generic sense, between a user 2 and a host 1. As with many other embodiments of networks not shown, the network 5 includes a plurality of users (e.g., employees) 10, or mobile devices attempting to communicate with the host 1 in order to gain access to an intranet 30. The communication may include users 10 communicating via wireless means 12 through the internet 15 eventually to the intranet 30 at the host 1. The network 5 includes the internet 15, an external firewall 20, a demilitarized zone (DMZ) 16 within which resides a web-based server 25, an internal firewall 22, and the intranet 30 beyond. A Virtual Private Network (VPN) 40 may include the intranet 30, internal firewall 22, and the web-based server 25. One shortcoming of this type of network 5 is that regardless of the location of the users 10 all of the communication between the users 10 and the intranet 30, as denoted by a 7, must flow back and forth through the internet 15, both firewalls 20, 22, the DMZ 16, and the web-based server 25. That is all communication 7 is through the VPN 40.

A common scenario for this type of network 5 is where users 10, via various wired and/or wireless network(s), are attempting to communicate without interruption from various locations with the host 1 (e.g., employer, application provider, etc.). Ideally, such communication between user 10 and host 1 would be secure and seamless (i.e., uninterrupted connectivity), as well as, provide seamless roaming capability (i.e., uninterrupted connectivity as a user 10 transitions both between wired and wireless network types) regardless of the location of the user 10.

Figure 2:
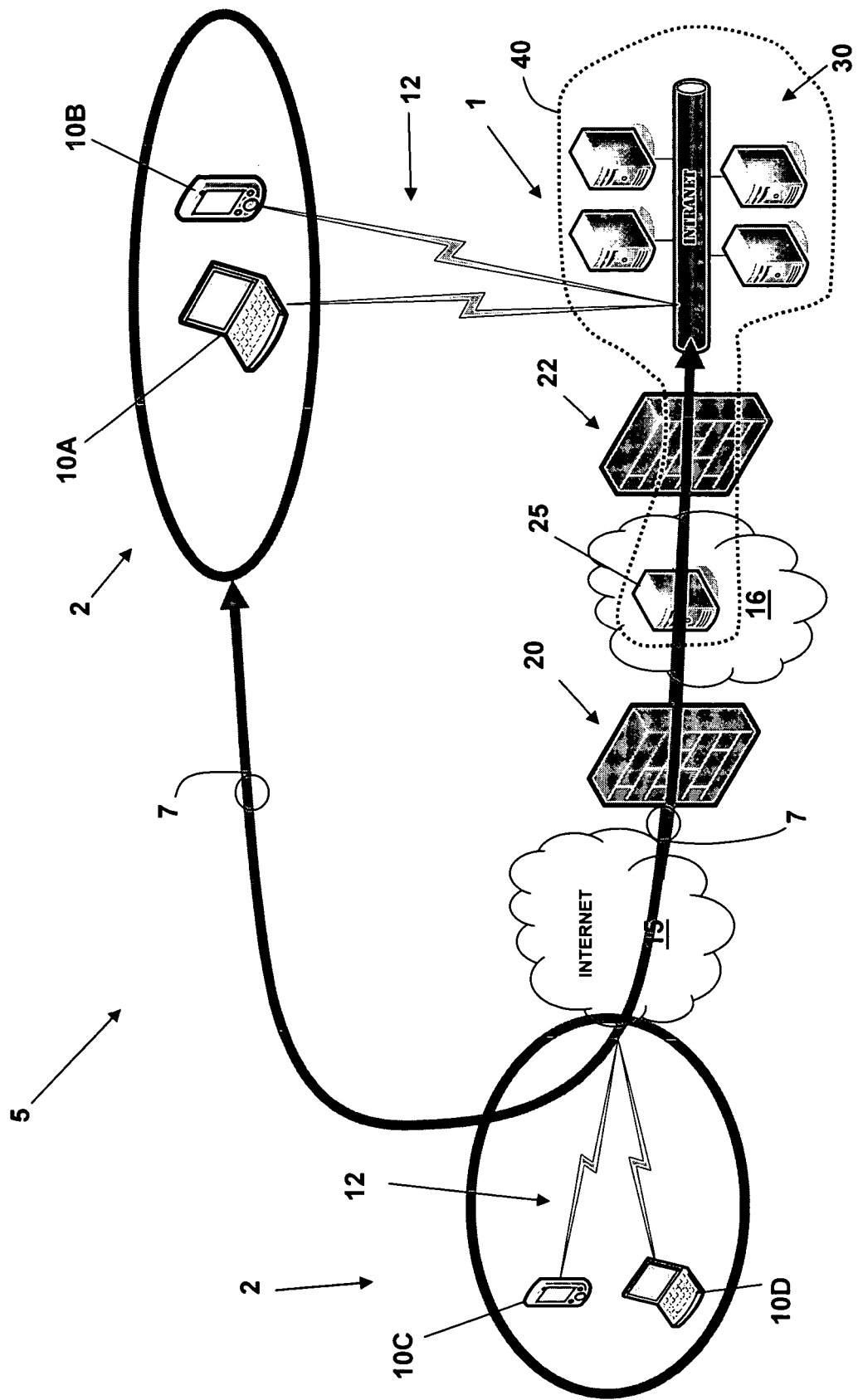
FIG. 2 depicts a second embodiment of a communication network showing roaming capabilities, in the related art.

Currently, as depicted in FIG. 2, there may be a plurality of users (e.g., 10A, 10B, 10C, 10D) all connected to the host 1. In the embodiment shown, two users 10A, 10B, via mobile devices, are connecting to the host 1 via a lap top personal computer and Personal Digital Assistant ("PDA"), respectively, as are two other users 10C, 10D. Due to existing roaming capabilities of the network 5, all four users 10A, 10B, 10C, 10D must communicate still through the VPN 40 (e.g., web server 25, DMZ 16, and firewalls 20, 22), regardless of their location or of the type of communication. For example, in the case of users (e.g., employees) 10A, 10B, even thought they are directly connected to the intranet 30, their communication still must go through the VPN 40 (e.g., firewalls 20, 22, web server 25, DMZ 16, etc.).

Thus all communication traffic going to the intranet 30 must go through the VPN 40 even when users 10 are connected directly to the intranet 30. This is because the web server 25 will push out routes to the user 10 that tell the user 10 to use, for example, a WECM Mobile Network Interface (MNI) interface. This behavior is crucial to providing roaming capability only when the application in use in the communication needs a persistent connection, wherein a persistent connection is a connection for which an open association exists between endpoints that must not be broken for uninterrupted connectivity.

Figure 3:
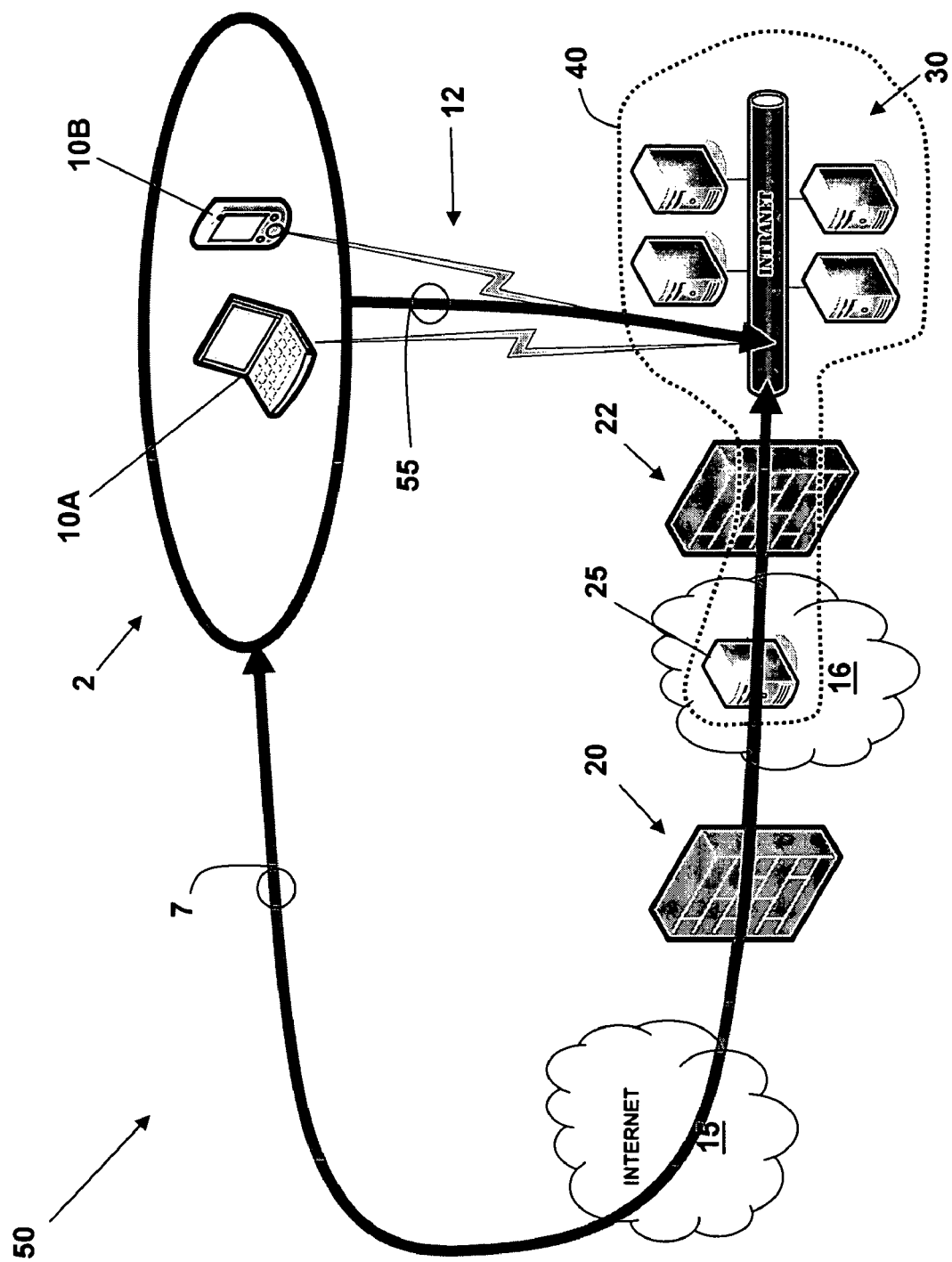
FIG. 3 depicts an embodiment of a communication network for advanced VPN routing in accordance with the present invention.

A network 50 that provides the advanced VPN roaming of the present invention is depicted in FIG. 3. In this embodiment, while the users 10 (e.g., 10A, 10B) will still connect to the web server 25 (e.g., WECM gateway) for roaming capabilities, the users 10A, 10B intelligently determine if the particular application in the communication requires a persistent connection. Thus, the invention determines what type of communication is to be conducted based upon protocol and destination port of the Protocol Data Unit (PDU), and appropriately chooses the proper routing mechanism. Thus, if the protocol dictates a persistent connection, the PDU is routed within the VPN 40. Conversely, if the protocol dictates a non-persistent connection, the PDU is routed outside of the VPN 40.

Thus, the present invention builds upon existing VPN technologies and adds a more granular approach to determine what network traffic should be routable inside of the VPN, and what network traffic should be directly routed to the destination without VPN intervention. This approach is performed while preserving any built-in seamless roaming capabilities that the existing VPN solution provides. One advantage of employing the invention is that connection-less traffic not required to route through the VPN 40 can simply bypass the VPN 40 and travel directly to the destination. This offers advantages including reducing the hop count for the end-user and conserving the bandwidth of the WECM gateway.

For example, if the application is any type that establishes a persistent connection (e.g., Telenet, Remote Desktop Protocol (RDP), Network File System (NFS), Secure Shell Protocol (SSH), File Transfer Protocol (FTP), SSH File Transfer Protocol (SFTP), a user-defined protocol, etc.) that is initiated, the user 10 will determine and know it requires a persistent connection in order to potentially roam. This connection is shown as 7. Conversely, if the application is any protocol that establishes a non-persistent connection (e.g., Internet Inter-ORB Protocol (IIOP), Hypertext Transfer Protocol (HTTP), Short Message Service (SMS), Wireless Application Protocol (WAP), Domain Name System (DNS), Multicast User Datagram Protocol (UDP), Internet Control Message Protocol (ICMP), Simple Mail Transfer Protocol (SMTP), Post Office Protocol 3 (POP3), Internet Message Access Protocol (IMAP), Multi-Purpose Internet Mail Extensions (MIME), a user-defined protocol, etc.) that is initiated, the user 10 will determine and know it does not need a persistent connection in order to potentially roam. This connection is shown as 55. In this manner, the present invention ensures seamless roaming in a more efficient manner.

Roaming includes the transition of wire line and/or wireless network mediums for which the address and/or port of the source PDU as it is known to the VPN server 25 changes. An example of in VPN vs. out of VPN real-time is establishing a Secure File Transfer Program (sftp) session to a server within the VPN network while browsing a web-page of a web server within the VPN network via HTTP, while within the VPN network. Sftp would route inside of the VPN 40 while HTTP will route directly to the destination web server (i.e., outside of the VPN).

Figure 4:
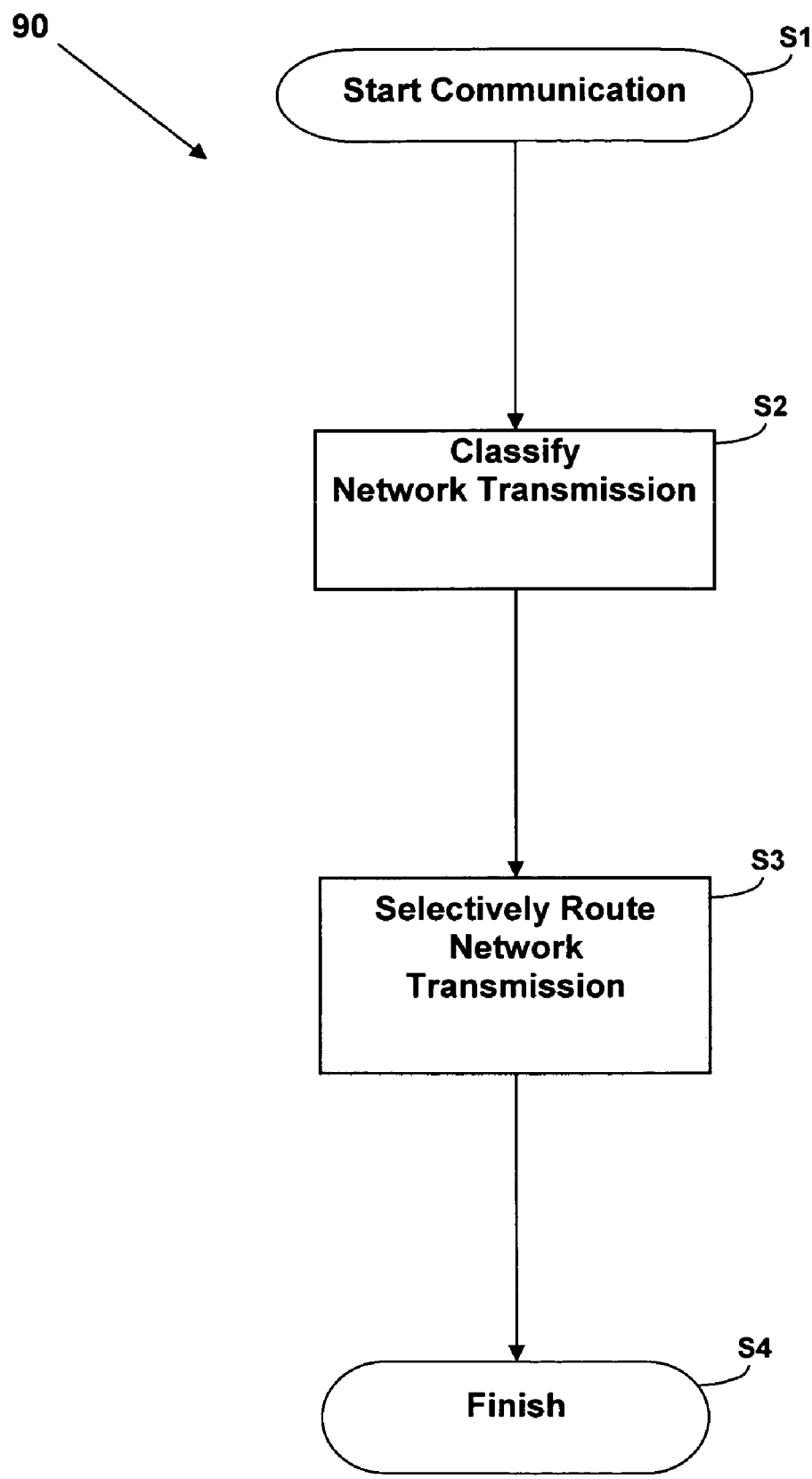
FIG. 4 depicts an embodiment of a method for advanced VPN routing in accordance with the present invention.

An embodiment of a method 90 for VPN routing, in accordance with the present invention is depicted in FIG. 4. The start of the method 90 is found at step S1. Upon the starting of the method 90 of routing, a network transmission is first classified, in step S2, for either a first or second route, wherein the classification is according to the route port and the protocol of the communication. The first route is through the VPN, while the second route if outside of the VPN. Thus, based upon the classification, the communication is then selectively routed, in step S3, in either the first or second route, based upon the classification step (i.e., S1). After step S3 is step S4 that marks the finish of an embodiment of the method 90, in accordance with the present invention.

The present invention ultimately provides a method, system, and computer program product for advanced VPN routing.

Figure 5:
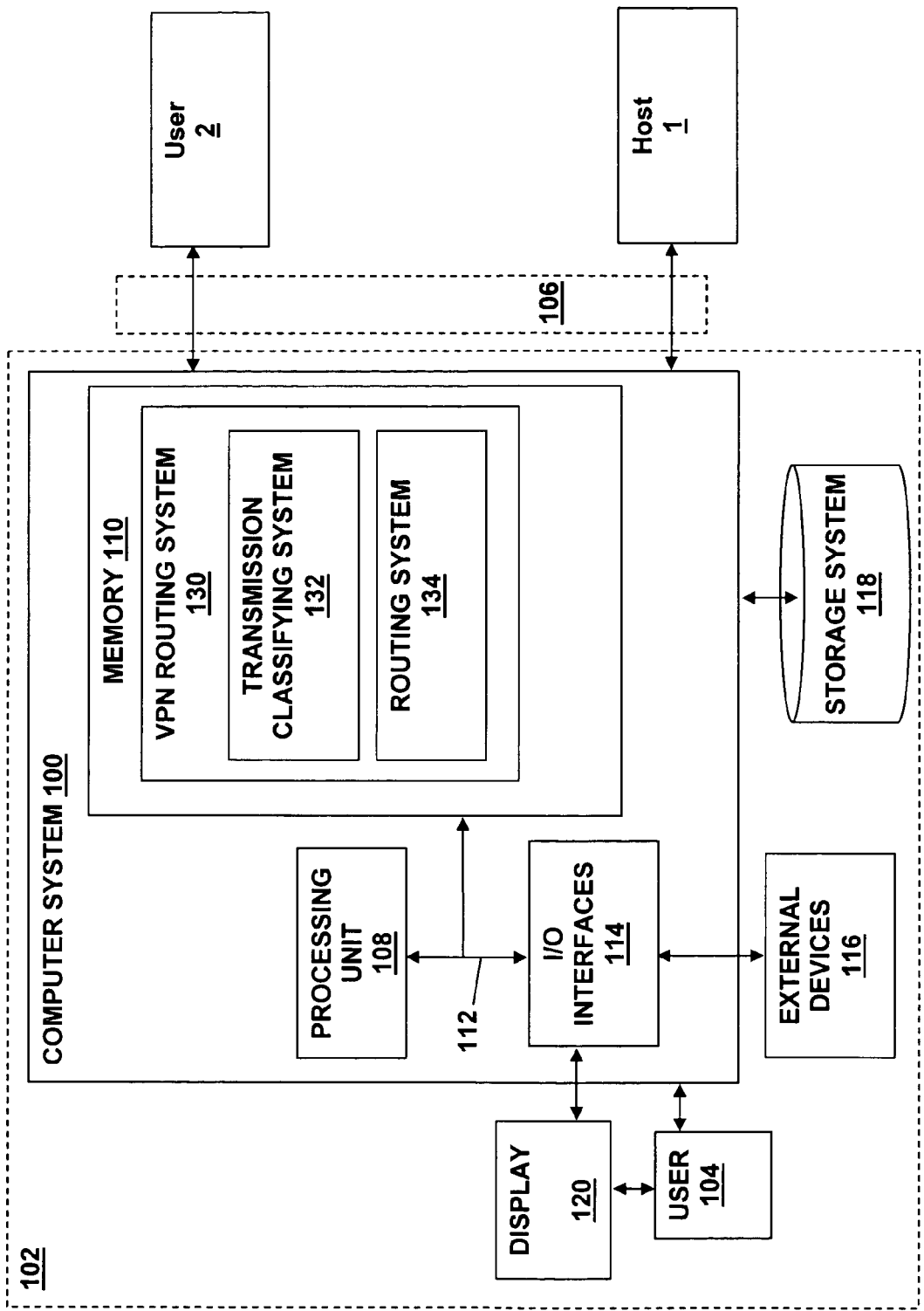
FIG. 5 depicts a computerized system for advanced VPN routing in accordance with the present invention.

A computer system 100 for providing advanced Virtual Private Network (VPN) routing in accordance with an embodiment of the present invention is depicted in FIG. 5. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides a service for providing advanced VPN routing, in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as a VPN Routing System 130, which is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 5 can be included in computer system 100. However, if computer system 100 comprises a handheld device or the like, it is understood that one or more external devices/resources 116 (e.g., display 120) and/or one or more storage system(s) 118 can be contained within computer system 100, and not externally as shown.

Storage system(s) 118 can be any type of system (e.g., a database) capable of providing storage for information under the present invention. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is a VPN Routing System 130 for providing advanced VPN routing, in accordance with embodiment(s) of the present invention. The VPN Routing System 130 generally includes a Transmission Classifying System 132 for classifying the type of electronic transmission, as described above. The VPN Routing System 130 generally includes a Routing System 134 for selectively routing the classified transmission, as described above.

The present invention can be offered as a business method on a subscription or fee basis. For example, one or more components of the present invention can be created, maintained, supported, and/or deployed by a service provider that offers the functions described herein for customers. That is, a service provider can be used to provide advanced VPN routing, as described above.

It should also be understood that the present invention can be realized in hardware, software, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk—read/write disk (CD-R/W), and a digital versatile disk (DVD).

Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method of Virtual Private Network (VPN) routing, comprising the steps of:
classifying a network transmission, between a user and a host intranet, selected for one of a first route and a second route of communication, wherein the first route is via a VPN and the second route is a direct connection with the host intranet and is not via the VPN, wherein the classifying is based upon a destination port and a protocol, wherein the network transmission for the first route comprises a communication that requires a persistent connection, and wherein the persistent connection sends and receives a plurality of HTTP transmissions over a same TCP connection, wherein the protocol of the network transmission for the first route is one from the group consisting of: Telenet, Remote Desktop Protocol (RDP), Network File System (NFS), Secure Shell Protocol (SSH), File Transfer Protocol (FTP), and SSH File Transfer Protocol (SFTP), wherein the protocol of the network transmission for the second route is one from the group consisting of: Internet Inter-ORB Protocol (IIOP), Hypertext Transfer Protocol (HTTP), Short Message Service (SMS), Wireless Application Protocol (WAP), Domain Name System (DNS), Multicast User Datagram Protocol (UDP), Internet Control Message Protocol (ICMP), Simple Mail Transfer Protocol (SMTP), Post Office Protocol 3 (POP3), Internet Message Access Protocol (IMAP), Multi-Purpose Internet Mail Extensions (MIME), and wherein the network transmission for the second route comprises data that does not require seamless roaming; and
selectively routing the network transmission based upon the classifying.

2. The method of claim 1, wherein the network transmission for the second route comprises a communication that needs a non-persistent connection.

3. The method of claim 1, wherein the VPN comprises a gateway server.

4. The method of claim 1, wherein a client comprises an intranet.

5. The method of claim 1, wherein the destination port comprises the destination port of a Protocol Data Unit (PDU).

6. A system of Virtual Private Network (VPN) routing comprising:
a system for classifying a network transmission, between a user and a host intranet, selected for one of a first route and a second route of communication, wherein the first route is via a VPN and the second route is a direct connection with the host intranet and is not via the VPN, wherein the classifying is based upon at least one of a destination port and a protocol, wherein the protocol of the network transmission for the first route is one from the group consisting of: Telenet, Remote Desktop Protocol (RDP), Network File System (NFS), Secure Shell Protocol (SSH), File Transfer Protocol (FTP), and SSH File Transfer Protocol (SFTP), wherein the protocol of the network transmission for the second route is one from the group consisting of: Internet Inter-ORB Protocol (IIOP), Hypertext Transfer Protocol (HTTP), Short Message Service (SMS), Wireless Application Protocol (WAP), Domain Name System (DNS), Multicast User Datagram Protocol (UDP), Internet Control Message Protocol (ICMP), Simple Mail Transfer Protocol (SMTP), Post Office Protocol 3 (POP3), Internet Message Access Protocol (IMAP), Multi-Purpose Internet Mail Extensions (MIME), and wherein the network transmission for the second route comprises data that does not require seamless roaming; and
a system for selectively routing the network transmission based upon the classifying.

7. The system of claim 6, wherein the network transmission for the second route comprises a communication that needs a non-persistent connection.

8. The system of claim 6, wherein the VPN comprises a gateway server.

9. The system of claim 6, wherein a client comprises an intranet.

10. The system of claim 6, wherein the destination port comprises the destination port of a Protocol Data Unit (PDU).

11. A computer readable medium for storing a program product for providing advanced Virtual Private Network (VPN) routing, comprising program code for processing the steps of:
classifying a network transmission, between a user and a host intranet, selected for one of a first route and a second route of communication, wherein the first route is via a VPN and the second route is a direct connection with the host intranet and is not via the VPN, wherein the classifying is based upon at least one of a destination port and a protocol, wherein the network transmission for the first route comprises a communication that requires a persistent connection and the second route comprises a communication that needs a non-persistent connection, and wherein the persistent connection sends and receives a plurality of HTTP transmissions over a same TCP connection, wherein the protocol of the network transmission for the first route is one from the group consisting of: Telenet, Remote Desktop Protocol (RDP), Network File System (NFS), Secure Shell Protocol (SSH), File Transfer Protocol (FTP), and SSH File Transfer Protocol (SFTP), wherein the protocol of the network transmission for the second route is one from the group consisting of: Internet Inter-ORB Protocol (IIOP), Hypertext Transfer Protocol (HTTP), Short Message Service (SMS), Wireless Application Protocol (WAP), Domain Name System (DNS), Multicast User Datagram Protocol (UDP), Internet Control Message Protocol (ICMP), Simple Mail Transfer Protocol (SMTP), Post Office Protocol 3 (POP3), Internet Message Access Protocol (IMAP), Multi-Purpose Internet Mail Extensions (MIME), and wherein the network transmission for the second route comprises data that does not require seamless roaming; and
selectively routing the network transmission based upon the classifying.

* * * * *